(12) United States Patent
Wen et al.

(10) Patent No.: US 8,351,513 B2
(45) Date of Patent: Jan. 8, 2013

(54) INTELLIGENT VIDEO SIGNAL ENCODING UTILIZING REGIONS OF INTEREST INFORMATION

(75) Inventors: Jiangtao Gene Wen, La Jolla, CA (US); Sujit Dey, La Jolla, CA (US); Parag Arole, La Jolla, CA (US); Jinwen Zan, San Diego, CA (US); Supriya Bhat, Oceanside, CA (US); Andjela Illic, La Jolla, CA (US)

(73) Assignee: Allot Communications Ltd. (IL)

( * ) Notice: Subject to any disclaimer, the term of this patent is extended or adjusted under 35 U.S.C. 154(b) by 1064 days.

(21) Appl. No.: 11/960,385

(22) Filed: Dec. 19, 2007

(65) Prior Publication Data

US 2008/0165861 A1 Jul. 10, 2008

Related U.S. Application Data

(60) Provisional application No. 60/870,788, filed on Dec. 19, 2006.

(51) Int. Cl.
*H04N 11/04* (2006.01)
(52) U.S. Cl. ......... 375/240.24; 375/240.16; 375/240.23; 375/240.26; 382/107; 382/236
(58) Field of Classification Search .......... 375/240.16, 375/240.23–240.26; 382/107, 236; 348/700
See application file for complete search history.

(56) References Cited

U.S. PATENT DOCUMENTS

| | | | |
|---|---|---|---|
| 6,839,452 B1 * | 1/2005 | Yang et al. ............ | 382/103 |
| 2005/0008075 A1 | 1/2005 | Chang | |
| 2006/0215766 A1 * | 9/2006 | Wang et al. .......... | 375/240.24 |
| 2006/0256867 A1 * | 11/2006 | Turaga et al. ........ | 375/240.16 |
| 2007/0153892 A1 | 7/2007 | Yin et al. | |

OTHER PUBLICATIONS

Christopoulos,. V.A., et al. "Contour simplification for segmented still image and video coding: algorithms and experimental results", Signal Processing: *Image Communication* (1999) 14:335-357.
Wiegand, Thomas, et al. "Overview of the H.264/AVC Video Coding Standard", *IEEE Transaction on Circuits and Systems for Video Technology* (2003) 13(7):560-576.
Xin, et al. "Motion and Mode Mapping for MPEG-2 to H.264/AVC Transcoding", *IEEE International Conference on Multimedia and Expo (ICME)* (Jul. 2006) pp. 1-4.
Yang, et al. "Rate Control for H.264 with Two-Step Quantization Parameter Determination but Single-Pass Encoding", *EURASIP Journal on Applied Signal Processing* (2006), Article ID 63409, pp. 1-13.

* cited by examiner

*Primary Examiner* — Jianye Wu
*Assistant Examiner* — Wanda Z Russell
(74) *Attorney, Agent, or Firm* — Kilpatrick Townsend & Stockton LLP (57) ABSTRACT

Digital video content is processed for delivery over a communications channel by segmenting the digital video content into one or more regions of interest (ROI) in accordance with content signature of the video content and encoding the digital video content in accordance with the ROI segmentation and the communications channel.

45 Claims, 5 Drawing Sheets

INTELLIGENT VIDEO SIGNAL ENCODING UTILIZING REGIONS OF INTEREST INFORMATION

CROSS-REFERENCE TO RELATED APPLICATIONS

This application claims the benefit of priority of co-pending U.S. Provisional Patent Application Ser. No. 60/870,788 entitled "Intelligent Video Signal Encoding With Spatial Regions Of Interest Information", by Jiangtao Wen et al. filed Dec. 19, 2006. Priority of the filing date of Dec. 19, 2006 is hereby claimed, and the disclosure of the Provisional Patent Application is hereby incorporated by reference.

BACKGROUND

Scarcity of available bandwidth as compared to the requirement for achieving acceptable quality of digital video content after compression as measured by display resolution, individual frame quality and frame rate will be a reality that video encoding systems will have to deal with for years to come. The increasing demand for digital video content, and the processing resources of devices for video content viewing, are such that more efficient use of available bandwidth continues to be of great importance.

SUMMARY

In accordance with the present invention, digital video content is processed for delivery over a communications channel by segmenting the digital video content into one or more regions of interest (ROI) in accordance with content signature of the video content and encoding the digital video content in accordance with the ROI segmentation and the communications channel. This provides more efficient use of the available bandwidth for digital video content.

More efficient use of bandwidth for transmission of digital video content and improved quality of experience (QoE) of the end user viewing the video content are provided, as measured as a tradeoff between frame quality, frame rate, and session quality such as stalls and buffering. Depending on the specific video content, e.g. sports action vs. drama vs. home shopping programming, professionally produced vs. user generated, high definition vs. standard definition, and so forth, the relative weights of the different factors impacting QoE may change for content to content and over time for the same piece of video content. Therefore to ensure delivering optimal QoE to the end user over challenging networks such as the internet and/or wireless networks with bandwidth starvations, variations and losses, the end to end system must be designed such that priorities are given to the QoE factors (e.g. frame quality, frame rate, levels of protection, etc. etc.) that have the most impact on the viewed video content on a content by content and time varying basis.

For example, it is recognized that not all regions within a single video frame are of equal importance to the perceptual quality of the decoded video. In addition, different regions in individual video frames have different characteristics, such as visual content complexity. In accordance with the present invention, when performing video encoding with stringent bandwidth restrictions, higher bit rates are allocated to regions in video frames that are identified as more important to perceived video quality, and/or to regions where the same amount of bits will result in more rapid reduction in compression artifacts (as measured by a predetermined metric such as peak signal to noise ratio), thereby achieving optimal visual quality on a per-frame basis at any given frame rate.

Similarly, in another aspect of the present invention, not all video content will require the same frame rate to deliver perceptually good motion rendition to the end user. A sports clip usually requires a higher frame rate than a news clip. Even for the same sports clip, usually the levels of motion will change over time, e.g. for a basketball game, the close-ups for fast breaks will require a higher frame rate than during time outs to deliver the same level of perceptually good motion rendition. In general, every piece of video content will have its unique "signature" of characteristics such as frame complexity, distributions of visual objects in a frame, color characteristics, levels of motion that are different from any other piece of content, and varying temporally (i.e. from frame to frame) and spatially (from area to area in the same frame). Therefore, based on such time varying signature of content, one can segment a piece of video content into temporal and spatial clusters, named "regions of interests" or ROIs in the present discussion, such that each carries a unique characteristic that is different from other ROIs or content.

Embodiments of the present invention provide an intelligent video coding system that identifies ROIs in video sequences and adjusts encoding parameters accordingly, resulting in the best visual quality at any particular bit rate.

Other features and advantages of the present invention should be apparent from the following description of exemplary embodiments, which illustrate, by way of example, aspects of the invention.

DETAILED DESCRIPTION

The video encoding techniques illustrated and described herein provide intelligent video encoding that identifies regions of interest (ROIs) in video sequences and adjusts video encoding parameters accordingly, resulting in the best visual quality at any particular bit rate. An intelligent encoder implemented in accordance with these techniques can provide encoding of video content having ROIs that include spatial ROIs and temporal ROIs.

Figure 1:
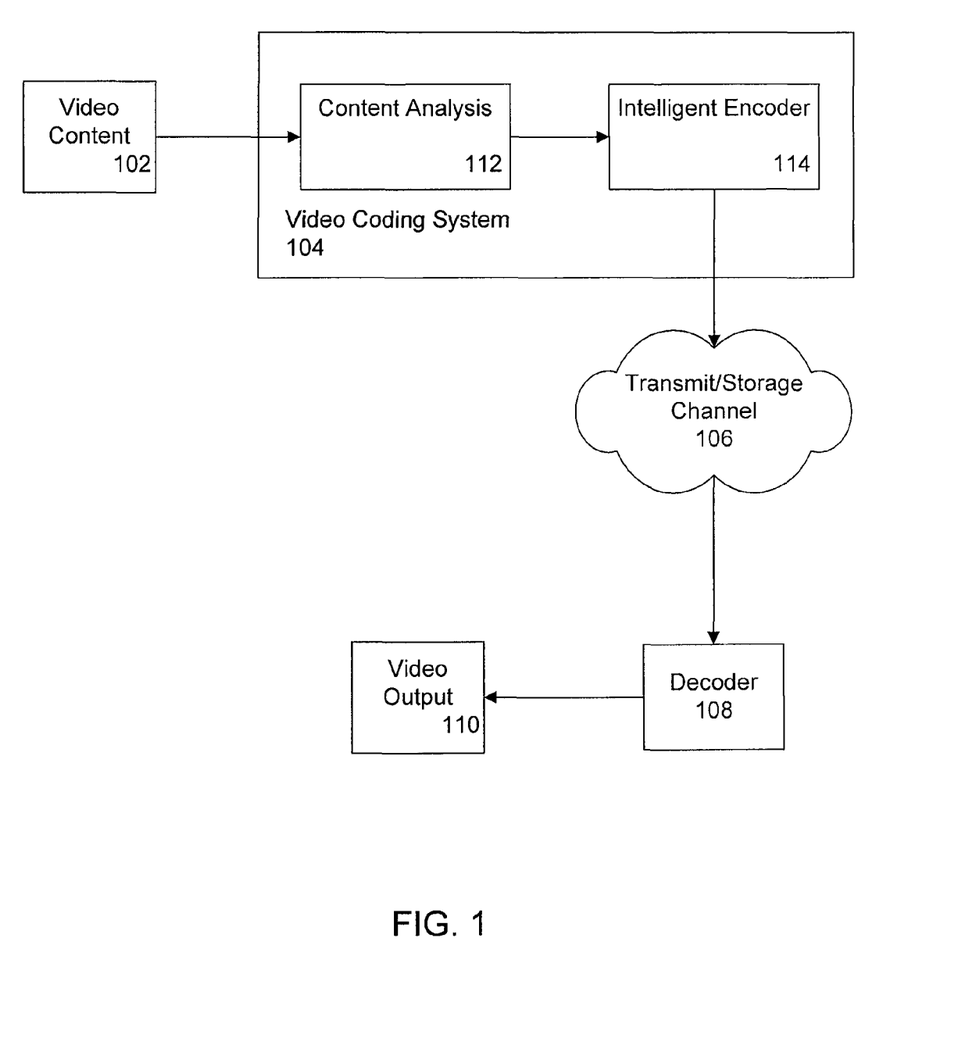
FIG. 1 is a block diagram of a system that performs the processing illustrated in FIG. 1.

FIG. 1 illustrates the construction of a system that encodes video content in accordance with the invention. The video content 102 is received at an intelligent video coding system 104 constructed in accordance with the present invention, wherein ROI content is identified and processed for optimal compression. The video content can comprise an entire segment of video content to be encoded, or it can be a portion of video content that is part of a larger whole or consolidated work, but comprises at least two frames of video content information. The identified ROI content may include spatial ROIs or temporal ROIs or both. The encoded content is transmitted or stored over a data channel 106, such as transmission over a network or storage at a server of a network such as the Internet. The encoded and compressed content is received by a user, either in real time following the encoding or later after retrieval from storage, and is processed by a decoder 108 that performs conventional decoding operations on the encoded compressed video content. The resulting video output 110 can be viewed on a conventional viewer, such as a computer display or video device.

Within the video coding system 104, a content analysis block 112 identifies spatial and/or temporal ROIs based on the digital video content. The identification operations can be performed manually, such as assignment of spatial ROI or temporal ROI by a person, but generally the content identification operations are implemented with automatic processing. Most video content will include many hundreds or thousands of frames, and automatic categorization of spatial ROI and temporal ROI frames by the coding system content analysis block 112 is more efficient. If desired, the automatic categorization may be performed in conjunction with a manual designation. After spatial and/or temporal ROIs are identified by the content analysis block, the intelligent encoder 114 performs encoding adjustments as described further below to produce the intelligently encoded video content.

The video coding system 104 may be implemented with a programmed processor having sufficient resources (such as system memory, input/output, and communications facilities) to perform the operations described herein. For example, the video coding system may include a general purpose processor that executes programming instructions to perform the operations described herein. The programming instructions may be stored as firmware in the system or may be stored in program memory or the like. The programming instructions may be received into the system 104 via a program product media containing programming instructions that are read by the system and that are executed to perform the operations described herein.

Figure 2:
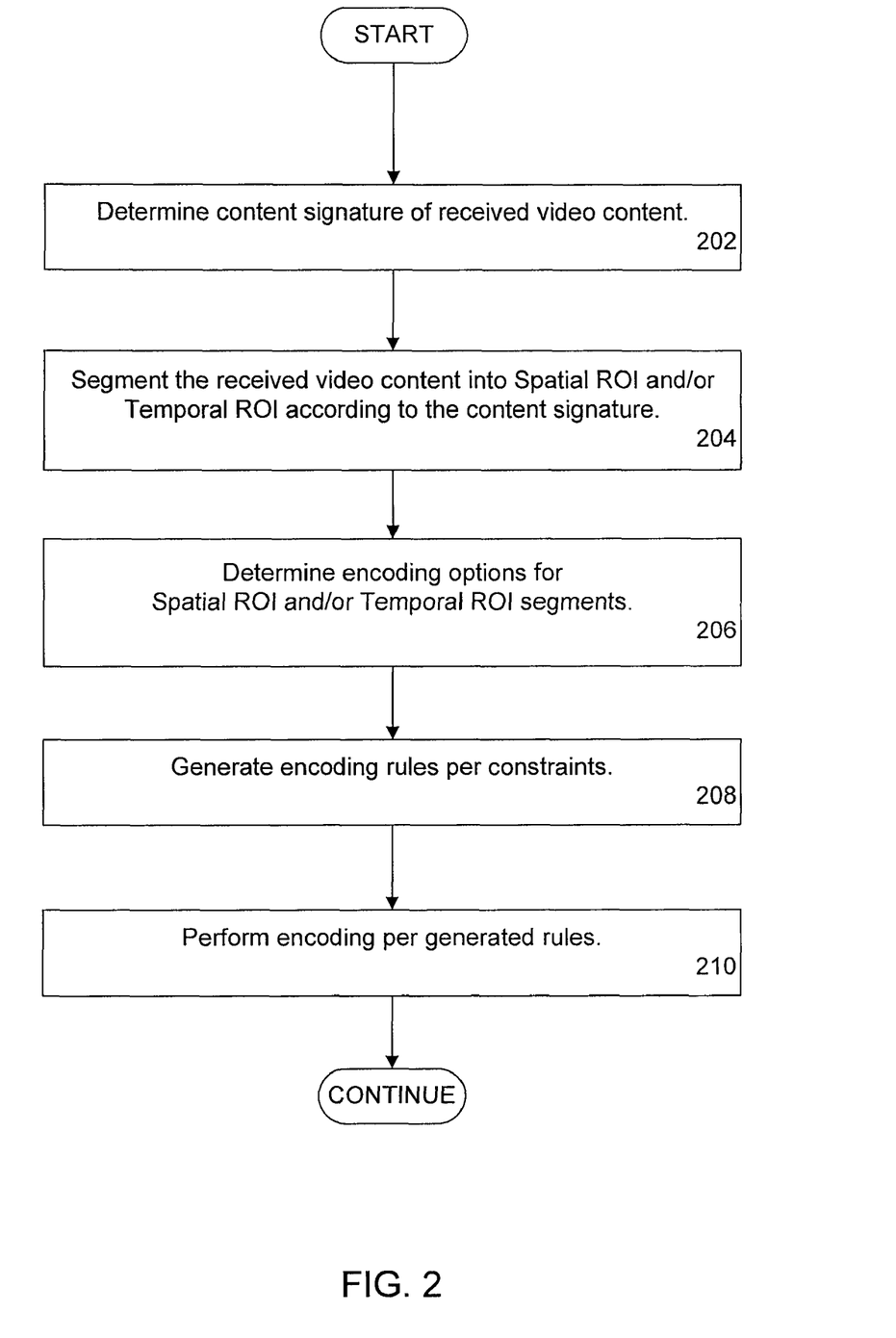
FIG. 2 is a flowchart of operations performed by the coding system illustrated in FIG. 1.

FIG. 2 is a flowchart that illustrates processing within the video coding system 104 of FIG. 1. In the first operation, indicated by the box 202, the content signature of the received video content is determined. As used herein, the content signature refers to characteristics of the video content from which an assessment of status as spatial ROI or temporal ROI can be made. The determination of content signature may be performed by a video encoder that detects, for example, motion vector information and frame-to-frame pixel or block differences. The encoder processing that determines the content signature comprises an initial analysis trial encoding. The encoder used to perform the analysis trial encoding may be a different encoder from that used for the actual output of the coding system at box 114 of FIG. 1.

In the next coding operation of FIG. 2, at box 204, the received video content is divided into spatial ROI and/or temporal ROI segments according to the content signature. For example, the analysis trial encoding may result in content signature information that identifies several frames each with areas of high visual complexity. In this operation 204, those portions of those frames may be designated as spatial ROIs. Similarly, the analysis trial encoding may result in identifying some frames that contain high motion content. Those high motion frames, a subset of the entire received video content, may be designated as temporal ROIs. Thus, the content signature determined in box 202 is used in box 204 to designate spatial and/or temporal ROIs.

At box 206, the encoding options are determined for any spatial ROIs and/or temporal ROIs from the segmentation operation. The encoding options are described in further detail below, but can include options for available frame rates for the bitstream output, for quantization parameters, and the like. The encoding options are constrained by the available resources of the coding system and any channel constraints or other limitations imposed by the combination of system resources and user resource (e.g. end user device 110) limitations. At box 208, encoding rules are generated for the video content according to the encoding constraints. The encoding rules may specify, for example, a selected frame rate or selected quantization parameters or the like. Lastly, at box 210, the encoding is performed in accordance with the encoding rules to produce the output bitstream.

Figure 3:
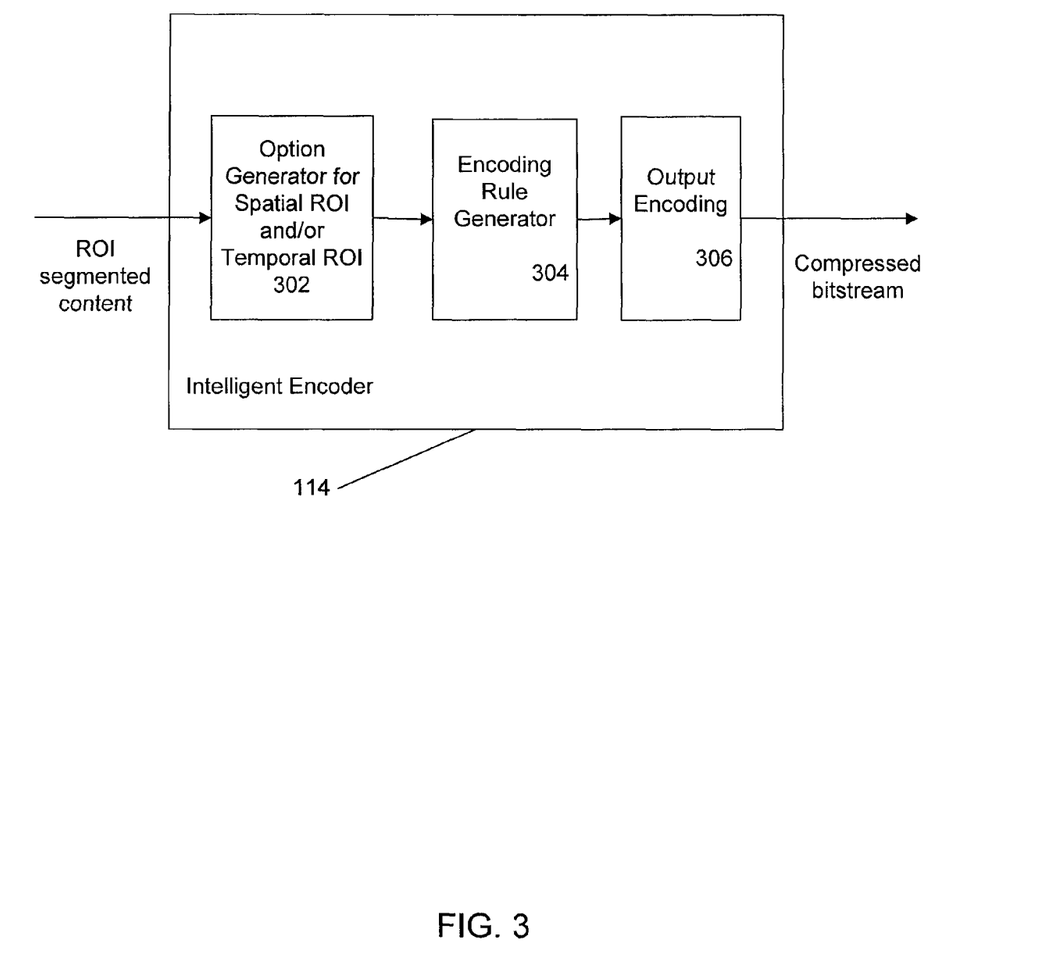
FIG. 3 is a block diagram of the intelligent encoder illustrated in FIG. 2.

FIG. 3 illustrates the construction of an exemplary intelligent encoder 114 (FIG. 1) constructed in accordance with the invention. The intelligent encoder receives an incoming video content stream that has been segmented according to ROI parameters. That is, one or more frames (or subdivisions of frames) may have been designated as spatial and/or temporal ROIs. The incoming video content may include the output of the trial analysis encoding described above. The incoming video is received at an option generator 302 that generates the options for the encoding operation, in view of the resources and constraints as noted above. Next, an encoding rule generator 304 determines the encoding parameter settings (i.e., the encoding rules) that will be selected for the video content and resources available. An output encoding block 306 then performs the encoding of the video content in accordance with the encoding rules to produce a compressed bitstream that is produced as output of the coding system.

The output encoder 306 may be a different encoder from the content analysis encoder 112 that is used for the initial analysis trial encoding. For example, the content analysis encoder 112 can have a simpler construction or specialized construction as compared with the output encoder 306, or the coding system 104 (FIG. 1) can make use of the same encoder for the content analysis and for the output encoding. Therefore, in the discussion below, the phrase "intelligent encoder" may be used to refer to the coding system 104 generally, as the context requires, unless the discussion is limited to the construction or features of the intelligent output encoder 114 specifically.

The operations of the intelligent encoder 114 illustrated in FIG. 3 can be performed for an entire input segment, such as a video clip, or can be performed for a subset of a video segment. The operations can be performed in real time, for streaming output that is viewed in real time, or the output can be stored and retrieved at a later occasion for viewing. The operations of an intelligent encoder 114 in accordance with the invention follow the illustration of FIG. 2 for both spatial ROIs and temporal ROIs. Details of the operations performed for each type of ROI will differ, as described in greater detail below.

Spatial ROI Based Intelligent Encoding

One aspect of the present invention is related to intelligent video encoding that identifies regions in video frames (named "spatial regions of interest" or spatial ROIs) that are (1) critical to the perceptual quality of the decompressed frame; and (2) allow for the most significant reduction in distortion as a result of the bit rate allocated. With spatial ROI information, the encoding system described herein intelligently adjusts encoding parameters and performs subsequent video encoding that will result in the best visual quality for compressed frames at a given bit rate.

All modern state-of-the-art video encoding systems employ temporal, and in some cases spatial predictive coding, as the core of the encoding algorithms. See, for example, the H.264 video coding standard "ISO/IEC 14496-10" also referred to as "MPEG-4 Part 10 Advanced Video Coding" (AVC). Usually the encoder divides the input video frames into non-overlapping macroblocks (MBs) of 16×16 pixels. Then the MBs are either coded with no reference to other MBs in other frames (termed Intra MBs), or the MBs are coded by first finding the best match between the MB to be encoded and a 16×16 array of pixels obtained from a previously encoded frame in a process called "motion estimation" (ME). The previously encoded frame is referred to as the reference frame. The 16×16 array found to be the best match is referred to as the "prediction" result. The displacement between the MB to be coded (the input) and the prediction (the best match) is termed the "motion vector" (MV). The difference (the "motion prediction residual") between the pixels in the MB to be coded and the pixels in the 16×16 prediction undergoes orthogonal transform and quantization. Finally, the quantized coefficients are run-length and entropy coded.

For MBs containing detailed visual information such as complex textures, better compression efficiencies can be achieved by dividing one 16×16 MB into smaller partitions that can be predicted separately. The choice of the size of the partition used in motion prediction are usually called coding modes. In addition, MBs that do not change significantly from frame to frame can be coded with the "SKIP" mode, wherein the MV is set to the default for the entire MB and the prediction residual is assumed to be zero. Most modern video encoding standards such as H.264 also include more advanced MB encoding modes such as bi-directional prediction, weighted prediction and temporal and spatial direct modes. In the H.264 standard, MBs can also be predictively coded with reference to previously encoded MBs in the same frame.

Although this discussion assumes operation according to a macroblock subdivision of the video content, the intelligent encoding described herein does not require processing according to a MB breakdown of the video content. That is, within a single frame, it is convenient to specify a spatial region of interest in terms of macroblocks (MBs), but other specifications of an area within a frame as a spatial ROI could be used, as well. For example, a pixel area within a frame, specified by pixel picture coordinates and having an arbitrary size rather than a fixed (MB) size, might be designated a spatial ROI, or an entire frame might be designated a spatial ROI. Such alternative specifications for a spatial ROI will be known to those skilled in the art, in view of the description herein. Similarly, a temporal ROI (described in greater detail below) could be specified in a number of ways, including elapsed or running time within a video content segment between start and stop, or video frame number within a video content segment.

As an example of alternative ways for specifying the ROI, consider a video sequence with overall low motion but varying frame complexity: some frames may contain very little texture details (low complexity) whereas other frames may have much detail and may be more difficult to compress. For such a video sequence, a frame level or even groups of frame-level spatial ROIs can be designated. For example, frame 21 through frame 86 of a video sequence might be designated as spatial ROI (65 frames total). Such frame-level spatial ROIs (i.e., frames 21-86 in the example) can be allocated a higher bitrate as compared to frames that are not so designated. In this case, the term "spatial" in the phrase "spatial regions of interests" means that the intelligent encoder can be optimized on a per-frame basis, i.e. optimized according to a 2-D "spatial" array of pixels, as opposed to considering the mutual redundancies between the frames.

In addition to frame-level spatial ROIs (i.e., spatial ROIs that are designated on a frame-by-frame basis), a region within a frame that is particularly complex or includes texture information or the like can be categorized into a subframe-level spatial ROI. Thus, multiple frames within a sequence of digital video content frames may be designated as spatial ROIs, and one or more regions within any one frame may be designated as spatial ROIs. The subframe-level regions comprising spatial ROIs may be allocated a higher bitrate as compared with other regions within the frame that do not comprise a spatial ROI. The subframe-level spatial ROIs may be designated at the MB level, or such spatial ROIs may be designated independently of MB and/or may comprise multiple MBs within the frame.

There are many alternative ways of producing a coded representation for MBs in video frames, as well as determining encoding parameters that are not "visible" to the decoder but determine the operation of the encoder as well as the quality of the coded representation that the encoder produces. In selecting one among the possibly hundreds of alternative coded representations as encoder output for an incoming video frame, a state-of-the-art video encoder will usually select the encoding mode and coding parameters used based on the Rate-Distortion (RD) tradeoff, i.e. the tradeoff between the number of bits required for a particular coded representation of the MB vs. the quality achieved, as usually measured in signal-to-noise-ratio (SNR) of the reconstructed MB by the decoder. The tradeoff is usually measured as a combined RD cost, in the form of RDCost=Distortion+lambda*Rate, where the distortion is SNR of the reconstruction, Rate is the number of bits for the coded representation that achieves the SNR, and lambda is called the "Lagrangian multiplier" that is selected by the encoder at its own discretion. The particular choice of the lambda is not transmitted, and therefore is transparent, to the decoder. However, the proper choice of the lambda is usually critical to the visual quality of the compression that the encoder produces. Those skilled in the art will be aware of prior research regarding the optimal choice of lambda factors as a function of the content and other encoding parameters such as frame type and quantization. A generally accepted value is included, for example, in the MPEG-ITU JVT H.264 reference software. The intelligent encoder described herein operates in a similar manner to select appropriate RD parameters to produce a coded representation.

Usually the intelligent encoder will examine the RD costs for several candidate encoding modes and parameter choices and will use the one that resulted in the lowest RD cost. Other selection schemes may be used, as well, as will be known to those skilled in the art.

In identifying spatial ROIs, video encoding systems embodying the present invention can utilize information provided by content creators or human "compressionists" as well as software and/or hardware systems external to the video encoding system, and/or information collected by the mechanism described herein.

Once the spatial ROIs are identified, the intelligent video encoder in the encoder system embodying the present invention will adjust the selection of encoding tools and associated encoding parameters it uses for encoding. These encoding tools include but are not limited to encoding modes (Intra/Inter), motion prediction modes (one or more MVs per MB, partition sizes), and SKIP/coded decisions. The encoding parameters include quantization parameters, quantization matrices, motion search ranges, and target bitrates allocated.

In general, MBs inside spatial ROI frames will be assigned larger motion search range, more candidate encoding modes, higher bitrates, and lower quantization step sizes as compared with areas of the video frame that are not located within a spatial ROI. Based on the bandwidth and error characteristics of the channel over which the compressed content is to be transmitted, the intelligent encoder may also be biased towards the selection of Intra coding modes and/or SKIP/coded modes in the RD mode and parameter decision process. Such biasing can be implemented by increasing/decreasing the lambda factor used in the calculation of the RD costs for candidate modes. In general, lambda should be increased if bit-saving encoding modes are deemed more desirable (resulting in a reduction of output bit rate at a cost of higher distortion), whereas lambda should be decreased if high quality reconstruction of the video is important (at a cost of higher output bit rate after compression).

Figure 4:
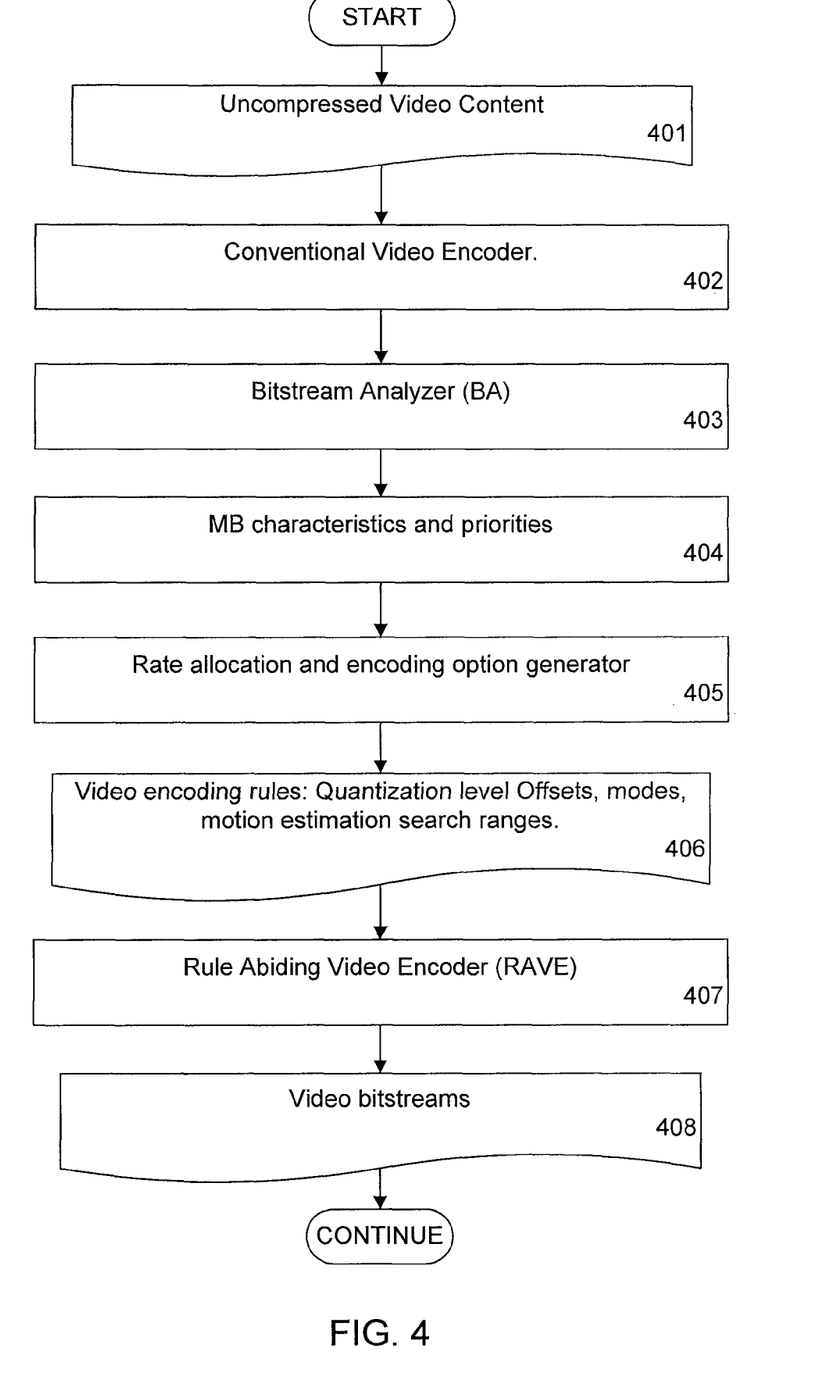
FIG. 4 is a system flow chart of operations performed by a system constructed in accordance with the present invention.

With reference to FIG. 4, in one implementation of the present invention, an encoding of the input video sequence 401 is performed (termed "the analysis trial encoding pass") using a conventional video encoder 402 with a fixed quantization parameter for all MBs and frames. The information obtained in the analysis trial encoding process is used to identify spatial ROIs by a bitstream analyzer 403. These operations 402, 403 can be performed by the content analysis block 112 illustrated in FIG. 1. That is, the content analysis block can include the analysis trial encoder and the bitstream analyzer. The analysis trial encoding pass can be performed over the entire video content before the next operations are performed, or a subset of the entire video content can be processed in the analysis trial encoding pass before being sent on to the next processing operation, while the remainder of the video content is received and processed in the content analysis operation 402 before being sent on for further processing. The output of the bitstream analyzer 403 comprises the content signature of the video content.

The input video sequence 401 can comprise an entire segment of video content to be encoded, or it can be a portion of video content that is part of a larger whole, or consolidated work. In any case, the input video sequence comprises at least two frames of video content information. The output from the analysis trial encoding pass 402 comprises a video bitstream that is encoded according to the encoder used. As noted above, the encoder used for the analysis encoding pass may be a different encoder from that used to generate the output of the intelligent encoder, or it may be the same.

In one aspect of the FIG. 4 implementation of the present invention, the information collected from the bitstream in the analysis trial encoding pass includes the size (in bits) of the coded representation of MBs, the encoding modes, the number of bits used for MVs of the MBs, the number of bits used for entropy and run-length coded quantized transform coefficients, the values of the horizontal and vertical components of the MV information, and the averages and variances of the aforementioned information. Such information comprises the video content signature information.

After the said information has been collected, MBs that consumed more bits for their coded representations than other MBs as a result of the initial analysis encoding pass are designated as spatial ROI MBs. Alternatively, as noted above, an entire frame may be designated a spatial ROI. This operation is represented in FIG. 4 by box 404.

The processing of box 405 involves the selection of encoding options by an option generator. During such intelligent encoder processing, the connectivity of the MBs in the spatial ROIs may be examined. This is because there is a certain overhead associated with changing the encoding parameters from MB to MB. For example, if an encoder embodying the current invention sets a quantization parameter QP=10 for the non-SROI MBs and a quantization parameter of QP=8 for the SROI MBs, and suppose that in raster scan order, MB1 is designated as a SROI MB, MB2 is designated as a non-SROI MB, and MB3 is designated as a SROI MB, then according to the MPEG-4 Part 2 video compression standard, extra bit rate is needed for MB2 to signal that there is a change of the quantization parameter from that for MB1 (QP=8 in this example), followed by another two extra bits to signal the actual QP change (+2 in this example). After MB2 is encoded, then for MB3, again, extra bitrates would be needed to signal the occurrence of a change of the quantization parameters from MB2 to MB3, as well as the actual QP change itself (−2 in this example). If the visual quality improvement achieved by designating MB1, MB 2, and MB3 as spatial ROI MB, non-spatial ROI MB, and spatial ROI MB respectively does not outweigh the extra bitrate required to signal the changes in the encoding parameters (the quantization parameter in our example) as a result of the designation, then a more optimal (in terms of bitrate-quality tradeoffs) solution would be to designate the three MBs (MB1 to MB3) as consecutive spatial ROI MBs or as consecutive non-spatial ROI MBs.

In yet another implementation of the present invention, the aforementioned spatial ROI segmentation is augmented with or replaced by manual tagging of content for ROI. Such manual tagging of content is typically performed by human "compressionists" who may designate ROIs based on knowledge of content. For example, frames of a video content clip that are known to involve fast action in the scenes or involve complicated textures may be designated spatial and/or temporal ROIs whether or not the intelligent encoder would otherwise have designated such frames and/or MBs as ROIs.

In another aspect of the present invention, after the spatial ROI MBs have been identified and the MB processing described above for box 404 has been completed, in the processing of box 405, the mode and parameters of operation for the video encoder are adjusted, either individually or in conjunction, such that:
- the quantization parameter of the spatial ROIs can be lowered;
- the search range of ME can be increased;
- the number of reference frames can be increased;
- the number of encoding modes examined before an optimal encoding mode is decided can be increased;
- the target bitrate assigned to the spatial ROI MBs can be increased;
- the Lagrangian multiplier lambda in the RD optimized ME and mode selection process can be decreased;
- the Lagrangian multiplier lambda in the RD cost calculation for ME modes that usually consume higher bit rate (e.g. motion prediction with smaller partition size) can be decreased.

The encoding modes and parameters generated from the previous operation 405 comprise encoding rules that can be stored in memory or in the file system 406, for example, for distributed coding applications wherein the analysis, rule setting, and actual encoding are performed at different geographical or network locations. In addition to segmenting video frames into spatial ROI MBs and non-spatial ROI MBs, encoding systems embodying the present invention can also classify MBs into different classes of spatial ROI and non-spatial ROI MBs with different levels of priorities. For example, the intelligent encoder can assign spatial ROI MBs to have the highest priority, the lowest quantization parameter, the highest target bitrate, the largest ME range, the most candidate reference frames, and the most motion prediction partition sizes. On the contrary, the non-spatial ROI MBs having the lowest overall priority can be assigned the highest quantization parameter, the lowest target bitrate, the smallest ME range, the fewest candidate reference frames, and the fewest motion prediction partition sizes. MBs designated as non-spatial ROI MBs with the lowest priority may be encoded with quantization parameters higher than the default quantization parameter selected for the entire frame.

In some video compression standards such as MPEG-4 Part 2 and H.263, there is a restriction on the maximum allowable changes of the quantization parameter from one MB to the next in raster scan order. Furthermore, the quantization parameter for MBs that are coded as SKIP MBs, or MBs that contain no non-zero transform coefficients after quantization in H.264, are assumed to be identical to the last non-SKIP (and with non-zero transform coefficients after quantization) MB. Therefore, in one aspect of an implementation of the present invention, after the target quantization parameter for an MB is determined based on spatial ROI information, the difference between the target and the quantization parameter for the last coded MB in the same frame is examined, and if the difference is greater than what is allowed by the standard, the target quantization parameter for the current MB is clipped to a value that satisfies the restrictions of the standard.

At box 407, the encoding rules 406 are used to perform the actual video encoding of the video content, in accordance with the rules. Therefore, the encoder may be referred to as a rule abiding video encoder (RAVE). The output of the encoder 407 provides an output bitstream in accordance with the rules. The encoder may produce multiple output bitstreams, each bitstream being produced in accordance with a particular rule set.

In one implementation of the present invention for non-real-time encoding, the analysis encoding pass is performed for substantially the entire input sequence, one frame at a time, so that the identification of the spatial ROI MBs can be made more robust and adaptive. For example, when scene change detection is performed along with the aforementioned approach for identifying spatial ROI MBs with bitrate consumption, motion vector and other information (e.g. bitrate for entropy coded quantized coefficients), it becomes possible to track the motion of spatial ROIs from frame to frame and thereby facilitate more robust identification and removal of "outliers" in spatial ROI identification due to, for example, noise in the input video content which will lead to the consumption of above average numbers of bits to compress, thereby resulting in false categorization of the said MB as a spatial ROI MB, even when the actual video content of the MB is of low importance or complexity. Utilizing information collected from previously encoded frames in the analysis encoding pass can also aid in adaptive setting of spatial ROI segmentation parameters (e.g. thresholds for the number of bits consumed by the MBs) and in facilitating automatic tracking of spatial ROIs when manual segmentation aid is provided, i.e. the human compressionists may only need to perform manual segmentation of the first frame in a scene with the spatial ROIs tracked from frame to frame automatically.

In substantially real-time applications however, the actual segmentation and encoding could be preceded by the analysis encoding pass by as low as one frame: i.e. the segmentation of spatial ROI and the subsequent encoding with spatial ROI information (box 405 of FIG. 4) for frame n may be performed as the analysis encoding box 403 of FIG. 4) is being carried out for frame n+1.

In applications such as wireless streaming where a single piece of content needs to be streamed to multiple users with different connection speeds, screen sizes and/or buffer sizes and processing powers, the streaming server could be designed so that multiple coded representations of the same content encoded at different bitrates, spatial and temporal resolutions and the like are generated, stored and later streamed to different clients. In such a system, spatial ROI information can be utilized in the encoding of the content bitstream produced for specific combinations of bit rate, frame size, and other constraints of the like. The spatial ROI information can either be for each specific combination by a targeted analysis encoding pass or generated with one analysis encoding pass for different encoding condition combinations.

A more cost effective alternative to the above approach of producing a fixed number of alternative bitstreams is to produce a collection of constituent bitstreams corresponding to alternative coded representations of portions of the content. Then, for each client with specific network and device constraints, a bitstream that satisfies the specific conditions of that individual client at that particular time can be generated by intelligently selecting and "stitching" constituent bitstreams with each other. In such a system, as the specific combination of segments of the constituent bitstreams were never actually generated in the encoding process, spatial ROI information can be admitted into the encoding process by utilizing the same in the encoding of each of the constituent bitstreams that will make up the "stitched together" bitstream.

Temporal ROI Based Intelligent Encoding

Spatial ROI analysis and intelligent encoding based on spatial ROI information can optimize the visual quality of individual frames at a given bitrate. However, the RD analysis and optimization and subsequent encoder parameter adjustment and optimization do not take into account, and therefore do not optimize, the impact or the necessity of encoding and transmitting a frame to the decoder. The optimization of frame quality is performed once a group of frames that needs to be encoded is determined. However, as video content exhibits motion characteristics that are different from content to content and that vary over time, not all frames need to be encoded for overall optimized visual quality for both individual frames as well as motion rendition as a function of time. This is due to the human visual perception of motion.

For example, a sports news clip could include highlights of games, which would benefit from 30 fps for good motion rendition, and could also include footage of news anchors and announcers, for which a much lower frame rate would provide the same level of motion smoothness for the viewer (the end user), owing to the low motion content of the news anchor footage. It would be wasteful therefore, to encode the news anchor and announcer footage also at 30 fps. If one can encode the corresponding segments of the low motion content at a lower frame rate of, say 15 fps, then at the same bitrate budget for the entire clip, the reduced frame rate of the anchor footage will lead to higher bitrate per frame overall, which can be utilized by spatial ROI based intelligent encoders such as described herein to achieve sharper frame quality for the high motion game footage frames that are encoded at the higher frame rate. This is in contrast to conventional variable frame rate based rate control algorithms, which, when given an overall bitrate budget for a piece of content with varying levels of motion over time, may "squander" bits on content segments that do not require a high frame rate and then, seeing that the encoder is running out of bits to use, resorts to dropping frames for higher motion segments following lower motion segments.

In identifying temporal ROIs, again, one can rely on human "compressionists" who can manually mark segments within a video clip as high or low motion, which can then be encoded accordingly. In reality, it is usually difficult for humans to categorize a video clip into more than two levels of motion (such as "high" vs. "low"), although it is perceivable that in some applications, e.g. when the same content is encoded into multiple bitstreams targeting delivery over different networks and devices with different bandwidth, loss characteristics, display resolution, CPU power and memory constraints, it is desirable to be able to segment content into more than two motion levels so that more targeted optimization of encoding parameters could be performed. Such multi-level categorization of content, however, is to accommodate multiple transmission conditions for each of the two motion levels, and has nothing to do with providing more than two levels of motion categorization for the content itself.

Therefore, in one aspect of the present invention, automatic temporal segmentation of content and temporal ROI analysis can be achieved by performing an analysis trial encoding, similar to trial encoding for spatial ROI identification. Once the analysis trial encoding is completed, the produced bitstream can be parsed with motion information extracted. The extracted motion information such as the amplitude of motion vectors, the distribution of the motion vector field over the frame, and its change over time, can be used to perform temporal ROI segmentation. For example, a threshold value can be set for amplitude of motion vectors that will be used to identify high motion portions of a video clip. Motion vectors having a lesser amplitude will be used to signal a low motion portion. Other parameters may be used to demarcate high motion portions from low motion portions. If desired, multiple frame rates could be used, such as 30 fps for high motion portions, 15 fps default, and 10 fps for low motion portions. Note, because the analysis trial encoding is only for analysis purposes, the trial encoding can be performed in a format or used with an encoder that is different from the encoder used for the eventual preparation and encoding of the content after temporal ROI analysis to produce output, e.g. the analysis trial encoding could be performed in MPEG-2, whereas the actual encoding for system output can be performed in H.264.

Because for most content, the spatial distribution of the motion vectors exhibit strong correlation, predictive coding is usually performed in most video coding standards, and only the difference (termed motion vector difference or MVD) between the predicted motion vector and the actual motion vector (termed the absolute motion vector) is coded in the bitstream.

In one implementation of the present invention, the MVD information extracted from the compressed bitstream will be used, and the average MVD amplitude (in both horizontal and vertical directions) will be calculated for each frame and compared with a set of thresholds to determine the motion level for the corresponding frame. The higher the average MVD amplitude, the higher the motion level. In alternative embodiments of the present invention, the median or max MVD value can also be used. Because even for high motion clips, there will often be regions in the frame that do not move from frame to frame (e.g. the background), usually, it is ill-advised to use the min MVD value for TRIO segmentation.

In determining the thresholds for temporal ROI analysis, the average value and variance of the MVD or absolute MV amplitudes of previously processed frames and/or the current can be used, e.g. by setting the threshold to a certain percentage of the average or amplitude.

In yet another implementation of the present invention, the ratio of the number of bits spent coding motion information vs. the number of bits spent coding other information (e.g. DCT information) can be compared to thresholds and the higher the ratio, the higher the motion level. The thresholds can pre-determined prior to temporal ROI analysis or be determined from previously analyzed frames and/or the current frame to be analyzed.

In still another implementation of the present invention, the variance of the MVD information and/or absolute MV information can be used to compare with a set of thresholds to determine frame motion levels. The higher the variance, the higher the motion level. The thresholds can be fixed over time, or determined dynamically based on previous analyzed frames and/or the current frame.

After the motion level of each individual frame is determined, in one implementation of the invention, a sliding window of frames is used to cluster the temporal ROI decision, i.e. if a certain percentage of the frames in the sliding window is marked at a certain motion level, the said motion level will be designated for all frames in the sliding window so as to prevent frequent changes in encoding parameters which may have negative side impacts on subsequent encoding and transmission of the content. In another implementation of the invention, when multiple motion levels are used in the system, the lowest and/or highest motion levels found in the frames in the window could be discarded with the corresponding frames designated to the next closest motion level.

The motion level information can then be used to optimize encoding parameters. On the frame level, the higher the motion level, usually the larger the search range when performing encoding for the said frame, and the lower the number of bits that needs to be allocated for the encoding of the frame. This is to prevent wasting precious bitrate on details in a video frame that can not be perceived by the human eyes, because usually the human visual system have a lower capability of distinguishing the details on fast moving objects.

On a group-of-frames level, low motion frames have a lower priority of being encoded. If the rate control requires, the corresponding frames can be dropped without being encoded to and transmitted in the bitstream. This will save bits by not encoding these frames whose incremental contribution to the perceptual quality does not justify the extra bits needed to encode them. In one implementation of the invention, the temporal ROI information is directly integrated in to the encoder and its rate control algorithm so that frames outside of the temporal regions of high interests will be dropped, resulting in a lower frame rate but higher individual frame quality for low motion regions and higher frame rate but less sharp picture for high motion regions, leading to a better overall QoE at the target bitrate.

In another implementation of the invention, when variable frame rate is not desirable or supported by the encoder/decoder, temporal ROI analysis is used as a pre-processing step. After temporal ROI information have been extracted, designated low motion frames will be dropped from the input frames, and taking their place in the sequence, the frames that are preceding the dropped frames will be duplicated so as to maintain the same overall nominal frame rate. As an illustrative example, from a sequence consisting Frames 1, 2, 3, 4, 5 where Frames 1, 2, 3 are high motion frames but Frames 4 and 5 are low motion frames, in pre-processing, Frames 1, 2, 3 are left alone while Frames 4 and 5 are dropped with Frame 3 duplicated in place of Frames 4 and 5. The output video sequence will then still consists of five frames: 1, 2, 3, 3, 3, containing three frames of actual content. The resulting sequence will include the same number of frames per second as the original and can then be encoded by a video encoder with the temporal ROI-based preprocessing completely transparent to the encoders. Because of the predictive coding nature of video encoders, the coded representation for the duplicated Frame 3 will be very small, leading to bandwidth savings that could be used for other frames in the video content clip.

In another aspect, the analysis trial encoding for identifying spatial and temporal ROIs can be performed sequentially or in parallel, or even merged into one process. In some applications, when precise identification of ROIs is required, it is desirable to perform the temporal ROI analysis and identification first so that only the critical temporal frames are preserved for further spatial ROI analysis, through a trial encoding on the remaining frames after temporal ROI analysis. That is, temporal ROI analysis may identify some frames that are dropped from the final encoding, such as those with low action (small or substantially zero motion vectors). The intelligent encoder may perform temporal ROI analysis first, so as to avoid spatial ROI processing on frames that would be dropped by the temporal ROI analysis. In other applications where complexity and delay is a concern, the intelligent encoder may use the temporal and spatial characteristics extracted from the same trial analysis encoding to perform both segmentations based on the same encoder output.

Figure 5:
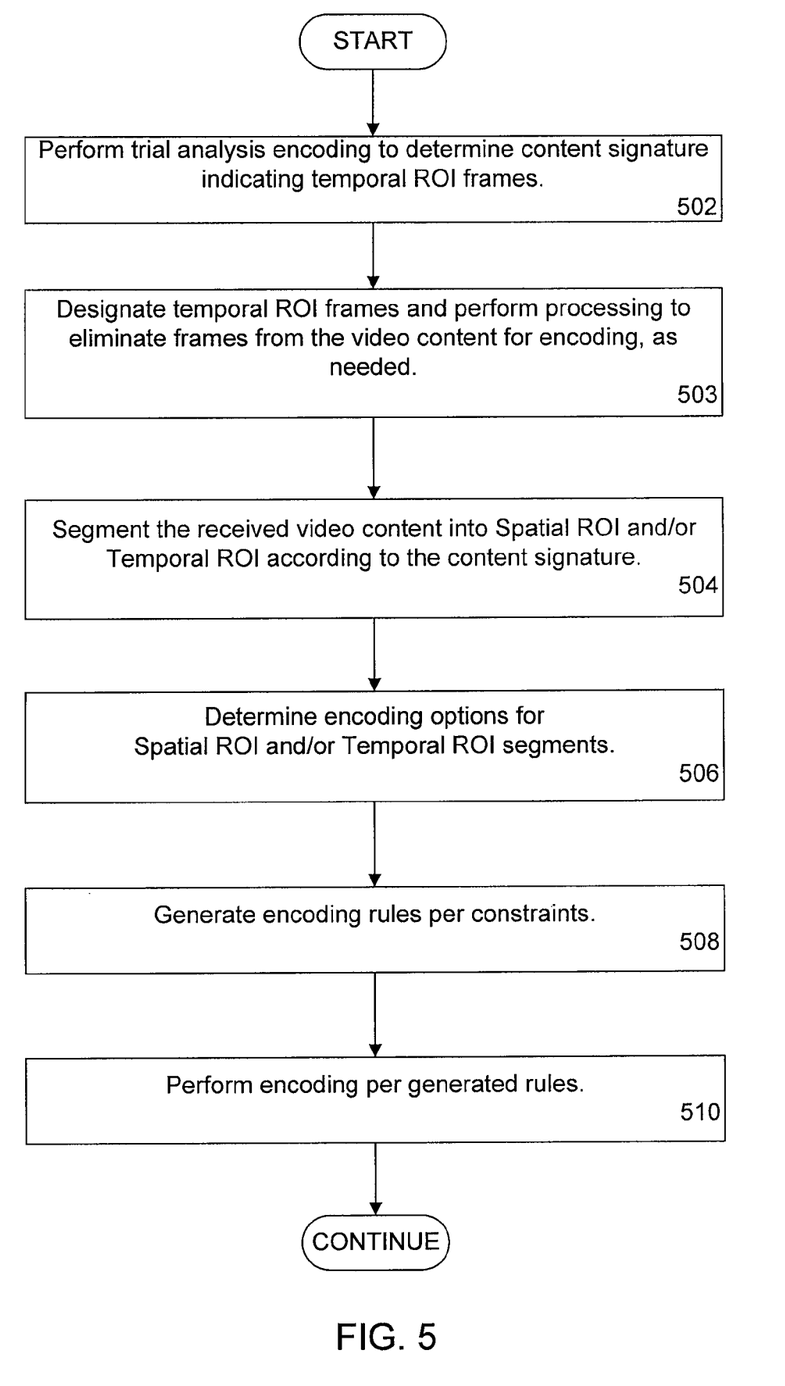
FIG. 5 is a flowchart of system operations in which temporal ROI analysis and spatial ROI analysis are performed sequentially.

FIG. 5 shows processing that involves an initial trial analysis encoding for temporal ROI processing followed by a spatial ROI processing pass. In the first operation, indicated by box 502, the content signature for the video content is determined from an initial trial analysis encoding pass with respect to identifying temporal ROI frames. For example, temporal ROI processing will be especially concerned with assessment of motion vectors and the like. As a result of the trial analysis encoding pass, one or more temporal ROI frames may be identified and certain frames may be eliminated or dropped from further encoder processing due to low motion content (box 503). The adjustment to the video content to eliminate unnecessary frames produces a video content clip comprising a temporal ROI adjusted video content.

At box 504, the intelligent encoder will then subject the temporal ROI adjusted video content to a trial analysis encoding pass with respect to identifying spatial ROI frames and/or spatial MBs within frames. In this way, duplicate frames inserted in place of dropped frames do not need to be processed in the spatial ROI pass, or will only generate minimal processing. In general, a frame that is "dropped" to form the temporal ROI adjusted video content may either be dropped completely from output encoding, or an appropriate number of duplicate frames can be substituted in place of the "dropped" frames. More particularly, for an encoder that supports encoding variable numbers of frames per second, a non-temporal ROI frame can be dropped without ever appearing at the output encoder. For an encoder that does not support variable frame rate encoding (which is the majority of encoders), dropped frames should be duplicated, so that regardless of the temporal ROI information, the output encoder sees the same number of total frames, but the actual number of "real" frames (i.e. unique frames) differs depending on the level of motion. Thus, the output of the content signature processing from box 502 through box 504 produces a processed video content in which the frames have been segmented into spatial ROI and/or temporal ROI frame data. The intelligent encoder then proceeds with operations as illustrated above in connection with FIG. 2, so that the next operation 506 is to determine encoding options for the respective spatial ROI and temporal ROI frames, followed by generating the encoding rules 508 and then performing the video output encoding in accordance with the rules 510.

The processing described herein produces a coded bitstream that can be used in conjunction with other customized processing to provide encoded digital video content that can be transmitted over a network communications channel to end users such that the customized processing determines bandwidth restrictions of the communications channel in real time and output encoded digital video content in accordance with the ROI and determined bandwidth restrictions. As noted above, the coded bitstream includes quantization parameters and motion search parameters for the intelligent encoding processing, such as a selected bitrate allocation of the encoding. The intelligent encoder described herein can be implemented within firmware of an encoder device, or the operations of the intelligent encoder can be implemented in programming instructions for an intelligent encoder processor of a programmed general purpose computer, such as a video content server, which those skilled in the art can achieve in view of the description herein. Such encoding operations can be performed by the intelligent encoder on digital video content to produce the encoded content that is then maintained at a content server that communicates with the network, or such encoding operations can be performed on digital video content that is then streamed directly from the intelligent encoder to the network, such as to a video content gateway that provides content to end users.

The techniques described herein can provide intelligent video encoding that identifies regions of interest in video content such that the video content is encoded according to parameter values that provide the best visual quality at any particular bit rate.

The features described herein, as performed by the exemplary coding system illustrated by the drawings, provide support for the following inventive claims and characteristics:

(1) Intelligent video encoding identifies spatial regions of interests information and allocates higher bit rates to regions in a video frame that are identified as more important to perceived video quality, and/or to regions where the same amount of bits will result in more rapid reduction in compression artifacts. Aspects of the intelligent video encoding include:
(a) Methods and apparatus of identifying and assigning different levels of priorities to macroblocks (MBs) in a video frame
(b) Method and apparatus of setting and adjusting priority levels of MBs so that the spatial ROI MBs are connected, or adjacent
(c) Methods and apparatus of adjusting encoder modes and parameters according to the priorities so that spatial ROI MBs are encoded with higher visual quality
(2) Intelligent video encoding identifying temporal regions of interests information and maintains higher frame rates, larger motion search ranges to higher motion frames and low frame rates and smaller motion search ranges to lower motion frames.
(3) Methods and apparatus as in claim 1, wherein the identification of MBs with higher priority is achieved by performing video encoding with a fixed quantization parameter for all MBs in all frames and analyze the output of the encoder.
(4) Method and apparatus as in claim 3, wherein higher priorities are assigned to MBs that consume more bits to encode at the said quantization parameter.
(5) Method and apparatus as in claim 1, wherein the encoder modes include SKIP/coded decision.

(6) Method and apparatus as in claim 1, wherein the encoder modes include Intra/Inter decision.
(7) Method and apparatus as in claim 1, wherein the encoder modes include motion prediction partition size.
(8) Method and apparatus as in claim 1, wherein the encoder parameters include quantization step size.
(9) Method and apparatus as in claim 1, wherein the encoder parameters include motion vector search range.
(10) Method and apparatus as in claim 1, wherein the encoder parameters include motion estimation precision (full-pel, half-pel, and ¼ pel).
(11) Method and apparatus as in claim 1, wherein the encoder parameters include number of reference frames considered.
(12) Method and apparatus as in claim 1, wherein the encoder parameters include the target bitrate.
(13) Method and apparatus as in claim 1, wherein the identification of MBs with higher/lower priorities is aided by human compressionists.
(14) Intelligent multimedia streaming system for multiple users over time varying and diversified network conditions, the system including:
 (a) A video content analyzer capable of producing spatial ROI information of the input content
 (b) Video content encoding system capable of encoding a plurality of constituent bitstreams with different target bitstreams and encoding parameters utilizing the spatial ROI information
(15) Methods and apparatus as in claim 2, wherein the identification of temporal regions of interests and high/low motion frames is achieved by performing video encoding with a fixed quantization parameter and analyze the output of the encoder.
(16) Method and apparatus as in claim 15, wherein higher motion levels are assigned to frames that have larger average motion vector difference amplitude.
(17) Method and apparatus as in claim 15, wherein higher motion levels are assigned to frames that have larger median motion vector difference amplitude.
(18) Method and apparatus as in claim 15, wherein higher motion levels are assigned to frames that have larger max motion vector difference amplitude.
(19) Method and apparatus as in claim 15, wherein higher motion levels are assigned to frames that have larger average absolute motion vector amplitude.
(20) Method and apparatus as in claim 15, wherein higher motion levels are assigned to frames that have larger median absolute motion vector amplitude.
(21) Method and apparatus as in claim 15, wherein higher motion levels are assigned to frames that have larger max absolute motion vector amplitude.
(22) Method and apparatus as in claim 15, wherein higher motion levels are assigned to frames that have a higher motion vector information bits to overall frame size (in bits) after compression ratio.
(23) Method and apparatus as in claim 15, wherein higher motion levels are assigned to frames that have a higher motion vector information bits to transform information bits ratio.
(24) Method and apparatus as in claim 15, wherein higher motion levels are assigned to frames that have a larger variance of motion vector difference amplitude values.
(25) Method and apparatus as in claim 15, wherein higher motion levels are assigned to frames that have a larger variance of absolute motion vector amplitude values.
(26) Methods and apparatus as in claims 16, 17, 18, wherein the motion vector difference of SKIP MBs are set as 0.
(27) Methods and apparatus as in claim 24, wherein the motion vector difference value for SKIP MBs are set to 0.
(28) Methods and apparatus as in claims 19, 20, 21, wherein the absolute motion vector of SKIP MBs are set to the predicted motion vector.
(29) Methods and apparatus as in claims 19, 20, 21, wherein the amplitude of the absolute motion vector of SKIP MBs are set to the average of the absolute motion vectors amplitudes of the current frame.
(30) Methods and apparatus as in claims 19, 20, 21, wherein the amplitude of the absolute motion vector of SKIP MBs are set to the average of the absolute motion vectors amplitudes of a previous frame.
(31) Methods and apparatus as in claims 19, 20, 21, wherein the amplitude of the absolute motion vector of SKIP MBs are set to the median of the absolute motion vectors amplitudes of the current frame.
(32) Methods and apparatus as in claims 19, 20, 21, wherein the amplitude of the absolute motion vector of SKIP MBs are set to the median of the absolute motion vectors amplitudes of a previous frame.
(33) Methods and apparatus as in claim 2, wherein the intelligent encoder will use temporal ROI motion level information and allocate larger search ranges for higher motion frames and smaller motion search ranges for lower motion frames.
(34) Methods and apparatus as in claim 2, wherein the intelligent encoder will use temporal ROI motion level information and assign higher quantization parameters for higher motion frames and lower quantization parameters for lower motion frames.
(35) Methods and apparatus as in claim 2, wherein the intelligent encoder will use temporal ROI motion level information and allocate fewer bits for higher motion frames and more bits for lower motion frames.
(36) Methods and apparatus as in claim 2, wherein the temporal ROI motion level information for the frames are clustered so that the motion level designation for frames are more uniformly distributed.
(37) Methods and apparatus as in claim 36, wherein the clustering of motion level designation is achieved by using a sliding window and assigning the most frequently designated motion level for the frames in the sliding window as the motion level designation for all frames in the window.
(38) Methods and apparatus as in claim 36, wherein the clustering of motion level designation is achieved by using a sliding window and with the frames having been designated with the highest and/or lowest motion level having their motion levels assigned to the next closest value.
(39) Methods and apparatus as in claim 2, wherein the intelligent encoder will use temporal ROI motion level information and use higher frame rates for higher motion segments (sliding windows) and lower frame rates for lower motion segments.
(40) Methods and apparatus as in claim 2, wherein temporal ROI based pre-processing is performed prior to and independent of video encoding.
(41) Methods and apparatus as in claim 40, wherein the temporal ROI based pre-processing drops frames designated as low motion frames and duplicate frames immediately before or after the dropped frames in the temporal locations of the dropped frames so that the resulted sequence has a frame rate and/or number of frames identical to that of the original sequence, but containing fewer unique frames of visual information.

The present invention has been described above in terms of presently preferred embodiments so that an understanding of the present invention can be conveyed. There are, however, many configurations and techniques for video coding schemes not specifically described herein, but with which the present invention is applicable. The present invention should therefore not be seen as limited to particular embodiments described herein, but rather it should be understood that the present invention has wide applicability with respect to video coding schemes. All modifications, variations, or equivalent arrangements and implementations that are within the scope of the attached claims should therefore be considered within the scope of the invention.

We claim:

1. A method of encoding digital video content for delivery over a communications channel, the method comprising:
   receiving output of a trial analysis encoding of the digital video content at an intelligent encoder from a content analysis block, the output of the trial analysis encoding based on the content such that the trial analysis encoding comprises a segmented digital video content that identifies one or more regions of interest (ROI) for each frame in the segmented digital video content in accordance with content signature of each corresponding frame in the digital video content;
   determining encoding options for the segmented digital video content of the received trial analysis encoding at the intelligent encoder in accordance with identified ROI of frames in the segmented digital video content, including motion level information, and in accordance with available processing resources;
   performing an encoding of the segmented digital video content at the intelligent encoder in accordance with the determined encoding options and the communications channel;
   wherein the encoded digital video content is viewable on a display device after decoding by a decoder.

2. A method as defined in claim 1, wherein the content signature indicates the ROI comprises a spatial ROI that defines a region over space in a frame of the digital video content.

3. A method as defined in claim 2, wherein the spatial region is defined according to a macroblock division of the frame.

4. A method as defined in claim 2, wherein performing the trial analysis comprises determining the content signature such that a region that has increased complexity is identified as comprising a spatial ROI.

5. A method as defined in claim 1, wherein the content signature indicates the ROI comprises a temporal ROI that identifies one or more frames of the digital video content as a ROI.

6. A method as defined in claim 5, wherein performing the trial analysis comprises determining the content signature such that motion level information of the video content is determined.

7. A method as defined in claim 6, wherein the motion level information comprises motion vectors that indicates motion for a pixel block of a frame with respect to a reference frame of the digital video content such that a motion vector of greater than a threshold magnitude is assessed to be a high motion frame comprising a temporal ROI.

8. A method as defined in claim 7, wherein encoding is performed such that a frame assessed to be a temporal ROI is encoded at a higher bitrate than a frame that is not assessed to be a temporal ROI.

9. A method as defined in claim 7, wherein the motion level information further includes motion vector difference information that is used to assess whether a frame is a high motion frame.

10. A method as defined in claim 7, wherein a motion level indicator for a frame is computed according to bits expended coding video information for motion information as compared with bits expended coding video information of a different type, such that the ratio determines the value of the motion level indicator.

11. A method as defined in claim 1, wherein performing the trial analysis comprises:
    determining the content signature of the digital video content in accordance with an analysis trial;
    designating one or more portions of the digital video content as an ROI in accordance with the determined content signature.

12. A method as defined in claim 11, wherein the analysis trial comprises an encoding in which frames of the video content are processed such that a frame region that has increased complexity is identified as comprising a spatial ROI.

13. A method as defined in claim 11, wherein determining the content signature includes performing motion estimation processing for frames of the digital video content such that frames of the digital video content with motion vectors greater than a threshold value are identified as comprising a temporal ROI.

14. A method as defined in claim 11, wherein determining the content signature comprises performing an analysis trial that includes:
    a trial analysis encoding comprising motion estimation processing such that frames of the digital video content with motion vectors greater than a threshold value are identified as comprising a temporal ROI;
    adjusting frames of the video content in accordance with the temporal ROI trial analysis encoding to eliminate unnecessary frames and produce a temporal ROI adjusted video content;
    a trial analysis encoding in which frames of the temporal ROI adjusted video content are processed such that a frame region that has increased complexity is identified as comprising a spatial ROI.

15. A method as defined in claim 1, wherein performing the encoding includes:
    determining bandwidth restrictions of the communications channel in real time; and
    output encoding in accordance with the ROI and determined bandwidth restrictions.

16. A method as defined in claim 15, wherein output encoding includes selecting quantization parameters of the encoding.

17. A method as defined in claim 15, wherein output encoding includes selecting motion search parameters of the encoding.

18. A method as defined in claim 15, wherein output encoding includes selecting bitrate allocation of the encoding.

19. A method as defined in claim 1, wherein performing the trial analysis encoding is performed with an encoder different from performing the encoding operation.

20. A video coding system for encoding digital video content for delivery over a communications channel, the system comprising:
    a content analysis block that performs a trial analysis encoding of the digital video content based on the content, such that the trial analysis encoding produces a segmented digital video content that identifies one or more regions of interest (ROI) for each frame in the segmented digital video content in accordance with content signature of each corresponding frame in the digital video content;

an intelligent encoder that determines encoding options for the segmented digital video content of the trial analysis encoding in accordance with identified ROI of frames in the segmented digital video content, including motion level information, and in accordance with available processing resources, and that encodes the segmented digital video content in accordance with the determined encoding options and the communications channel;

wherein the encoded digital video content is viewable on a display device after decoding by a decoder.

21. A system as defined in claim 20, wherein the content signature indicates the ROI comprises a spatial ROI that defines a region over space in a frame of the digital video content.

22. A system as defined in claim 21, wherein the spatial region is defined according to a macroblock division of the frame.

23. A system as defined in claim 21, wherein the content analysis block determines the content signature such that a region that has increased complexity is identified as comprising a spatial ROI.

24. A system as defined in claim 20, wherein the content signature indicates the ROI comprises a temporal ROI that identifies one or more frames of the digital video content as a ROI.

25. A system as defined in claim 24, wherein the content analysis block segments by determining the content signature such that motion level information of the video content is determined.

26. A system as defined in claim 25, wherein the motion level information comprises motion vectors that indicates motion for a pixel block of a frame with respect to a reference frame of the digital video content such that a motion vector of greater than a threshold magnitude is assessed to be a high motion frame comprising a temporal ROI.

27. A system as defined in claim 26, wherein a frame that is assessed to be a temporal ROI is encoded at a higher bitrate than a frame that is not assessed to be a temporal ROI.

28. A system as defined in claim 26, wherein the motion level information further includes motion vector difference information that is used to assess whether a frame is a high motion frame.

29. A system as defined in claim 26, wherein a motion level indicator for a frame is computed according to bits expended coding video information for motion information as compared with bits expended coding video information of a different type, such that the ratio determines the value of the motion level indicator.

30. A system as defined in claim 20, wherein the content analysis block performs segmenting by operations comprising:
determining the content signature of the digital video content in accordance with an analysis trial;
designating one or more portions of the digital video content as an ROI in accordance with the determined content signature.

31. A system as defined in claim 30, wherein the analysis trial comprises an encoding in which frames of the video content are processed such that a frame region that has increased complexity is identified as comprising a spatial ROI.

32. A system as defined in claim 30, wherein the content analysis block determines the content signature by performing motion estimation processing for frames of the digital video content such that frames of the digital video content with motion vectors greater than a threshold value are identified as comprising a temporal ROI.

33. A system as defined in claim 30, wherein the content analysis block determines the content signature by performing an analysis trial that includes:
a trial analysis encoding comprising motion estimation processing such that frames of the digital video content with motion vectors greater than a threshold value are identified as comprising a temporal ROI;
adjusting frames of the video content in accordance with the temporal ROI trial analysis encoding to eliminate unnecessary frames and produce a temporal ROI adjusted video content;
a trial analysis encoding in which frames of the temporal ROI adjusted video content are processed such that a frame region that has increased complexity is identified as comprising a spatial ROI.

34. A system as defined in claim 20, wherein the encoding performed by the intelligent encoder includes operations comprising:
determining bandwidth restrictions of the communications channel in real time; and
output encoding in accordance with the ROI and determined bandwidth restrictions.

35. A system as defined in claim 34, wherein output encoding includes selecting quantization parameters of the encoding.

36. A system as defined in claim 34, wherein output encoding includes selecting motion search parameters of the encoding.

37. A system as defined in claim 34, wherein output encoding includes selecting bitrate allocation of the encoding.

38. A system as defined in claim 20, wherein the content analysis block performs segmenting with the intelligent encoder.

39. A system as defined in claim 20, wherein the content analysis block performs its operations with an encoder that operates independently of the intelligent encoder.

40. A system as defined in claim 20, wherein the intelligent encoder includes:
an option generator that generates encoding options for the digital video content in accordance with the identified spatial ROIs and temporal ROIs; and
an encoding rule generator that generates encoding rules such that the encoded digital video content is produced in accordance with encoding parameters indicated by the rules.

41. A method of encoding digital video content for delivery over a communications channel, the method comprising:
performing an analysis trial that determines content signature of the digital video content such that the analysis trial comprises an encoding in which frames of the video content are processed such that a frame region that has increased complexity is identified as comprising a spatial ROI and motion estimation processing for frames of the digital video content such that frames of the digital video content with motion vectors greater than a threshold value are identified as comprising a temporal ROI;
segmenting the digital video content into one or more regions of interest (ROI) in accordance with the content signature of each corresponding frame in the digital video content;
determining encoding options for the segmented digital video content of the analysis trial encoding in accordance with identified ROI of frames in the segmented digital video content, including motion level information, and in accordance with available processing resources;

performing an encoding of the segmented digital video content in accordance with the determined encoding options and the communications channel;

wherein the encoded digital video content is viewable on a display device after decoding by a decoder.

42. A method as defined in claim 41, wherein performing the analysis trial comprises:

motion estimation processing wherein frames of the digital video content with motion vectors greater than a threshold value are identified as comprising a temporal ROI;

adjusting frames of the video content in accordance with the temporal ROI trial analysis encoding to eliminate unnecessary frames and produce a temporal ROI adjusted video content;

spatial analysis processing wherein frames of the temporal ROI adjusted video content are processed such that a frame region that has increased complexity is identified as comprising a spatial ROI.

43. A method as defined in claim 41, wherein encoding comprises:

generating encoding options for the digital video content in accordance with the identified spatial ROIs and temporal ROIs; and generating encoding rules such that the encoded digital video content is produced in accordance with encoding parameters indicated by the rules.

44. A program product for use in a computer system that executes program instructions recorded in a non-transitory computer-readable media to perform a method for encoding digital video content for delivery over a communications channel, the program product comprising:

a non-transitory recordable media;

a program of computer-readable instructions recorded on the non-transitory recordable media, wherein the instructions are executable by the computer system to perform operations comprising:

performing an analysis trial that determines content signature of the digital video content such that the analysis trial comprises an encoding in which frames of the video content are processed such that a frame region that has increased complexity is identified as comprising a spatial ROI and motion estimation processing for frames of the digital video content such that frames of the digital video content with motion vectors greater than a threshold value are identified as comprising a temporal ROI;

segmenting the digital video content into one or more regions of interest (ROI) in accordance with content signature of each corresponding frame in the digital video content;

determining encoding options for the segmented digital video content of the analysis trial encoding in accordance with identified ROI of frames in the segmented digital video content, including motion level information, and in accordance with available processing resources;

performing an encoding of the segmented digital video content in accordance with the determined encoding options and the communications channel;

wherein the encoded digital video content is viewable on a display device after decoding by a decoder.

45. A program product as defined in claim 44, wherein the operation of segmenting comprises:

performing an analysis trial that determines content signature of the digital video content such that the analysis trial comprises an encoding in which frames of the video content are processed such that a frame region that has increased complexity is identified as comprising a spatial ROI and motion estimation processing for frames of the digital video content such that frames of the digital video content with motion vectors greater than a threshold value are identified as comprising a temporal ROI;

segmenting the digital video content into one or more regions of interest (ROI) in accordance with the content signature of the digital video content.

* * * * *